US010735623B2

(12) United States Patent
Evans (10) Patent No.: US 10,735,623 B2
(45) Date of Patent: *Aug. 4, 2020

(54) ARRANGEMENTS FOR ENHANCING DIGITAL WATERMARK DECODING

(71) Applicant: Digimarc Corporation, Beaverton, OR (US)

(72) Inventor: Eric D. Evans, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/247,155

(22) Filed: Jan. 14, 2019

(65) Prior Publication Data

US 2019/0222715 A1    Jul. 18, 2019

Related U.S. Application Data

(63) Continuation of application No. 15/424,013, filed on Feb. 3, 2017, now Pat. No. 10,182,170.
(Continued)

(51) Int. Cl.
*G06K 9/00* (2006.01)
*H04N 1/32* (2006.01)
(Continued)

(52) U.S. Cl.
CPC ..... *H04N 1/32267* (2013.01); *G06K 7/10722* (2013.01); *G06K 7/1413* (2013.01);
(Continued)

(58) Field of Classification Search
CPC .......... H04N 1/00846; H04N 1/32144; H04N 1/32149; H04N 1/3216; H04N 1/32165; H04N 1/3217; H04N 1/32187; H04N 1/32203–32267; H04N 1/32288–32352; H04N 19/467; H04N 21/23892; H04N 21/8358; H04N 2201/3233; H04N 2201/327; H04N 2201/3205; H04N 2201/3207; H04N 2201/3226; H04N 2201/3239; H04N 2201/3271; H04N 2201/3236; H04N 2005/91335;
(Continued)

(56) References Cited

U.S. PATENT DOCUMENTS 6,546,114 B1    4/2003    Venkatesan et al.
7,574,014 B2    8/2009    Sharma et al.
(Continued)

OTHER PUBLICATIONS

Barni et al, Copyright Protection of Remote Sensing Imagery by Means of Digital Watermarking, International Symposium on Remote Sensing, pp. 565-576, International Society for Optics and Photonics, 2001.
(Continued)

*Primary Examiner* — Jose L Couso
(74) *Attorney, Agent, or Firm* — Digimarc Corporation (57) ABSTRACT

Imagery captured by a point-of-sale scanner (e.g., in a supermarket) for purposes of barcode decoding, is contrast-enhanced preparatory to use for watermark decoding—despite the fact that such operation may sometimes result in contrast between certain pixels being diminished. A great variety of other features and arrangements are also detailed.

24 Claims, 7 Drawing Sheets

Related U.S. Application Data (60) Provisional application No. 62/290,753, filed on Feb. 3, 2016.

(51) Int. Cl.

| | | |
|---|---|---|
| *G06Q 20/20* | (2012.01) | |
| *G06K 7/10* | (2006.01) | |
| *G06K 7/14* | (2006.01) | |
| *G06T 1/00* | (2006.01) | |
| *G07D 7/005* | (2016.01) | |
| *G07G 1/00* | (2006.01) | |
| *G06K 9/46* | (2006.01) | |
| *G06T 5/00* | (2006.01) | |

(52) U.S. Cl.
CPC ......... *G06K 9/4647* (2013.01); *G06Q 20/208* (2013.01); *G06T 1/005* (2013.01); *G06T 5/009* (2013.01); *G07D 7/005* (2017.05); *G07G 1/0045* (2013.01); *H04N 1/32352* (2013.01); *G06T 2201/0051* (2013.01); *G06T 2201/0065* (2013.01); *G06T 2207/20208* (2013.01)

(58) Field of Classification Search
CPC .... G06K 7/10722; G06K 7/1413; G06K 9/46; G06K 9/4604; G06K 9/4647; G06K 9/6204; G06K 2009/3225; G06Q 20/208; G06T 1/0021–0092; G06T 3/40; G06T 5/009; G06T 2201/0064; G06T 2201/0065; G06T 2201/0052; G06T 2201/0083; B42D 25/29; B42D 25/00; B42D 25/382; B42D 25/387; G07D 7/004; G07D 7/0034; G07G 1/0045
See application file for complete search history.

(56) References Cited

U.S. PATENT DOCUMENTS

| | | |
|---|---|---|
| 7,684,623 B2 | 3/2010 | Shen et al. |
| 2004/0263911 A1 | 12/2004 | Rodriguez |
| 2006/0209356 A1* | 9/2006 | Sekizawa ............... H04N 1/407 358/448 |
| 2006/0290992 A1* | 12/2006 | Loce ....................... B41M 3/14 358/3.28 |
| 2019/0340341 A1* | 11/2019 | Fleck ..................... H04L 63/20 |

OTHER PUBLICATIONS

Piva et al, Copyright Protection of Digital Images by Means of Frequency Domain Watermarking, SPIE's International Symposium on Optical Science, Engineering, and Instrumentation. International Society for Optics and Photonics, pp. 25-35, 1998.

* cited by examiner

| 33 | 33 | 33 | 33 | 33 | 33 | 33 | 33 |
|----|----|----|----|----|----|----|----|
| 33 | 33 | 33 | 31 | 31 | 33 | 33 | 33 |
| 33 | 33 | 33 | 31 | 31 | 33 | 33 | 33 |
| 33 | 33 | 33 | 33 | 33 | 33 | 33 | 33 |
| 33 | 33 | 33 | 33 | 33 | 33 | 33 | 33 |
| 33 | 33 | 33 | 33 | 33 | 33 | 33 | 33 |

FIG. 5A

| 33 | 33 | 33 | 33 |
|----|----|----|----|
| 33 | 33 | 33 | 33 |
| 33 | 33 | 33 | 33 |

| 33 | 33 | 33 | 33 | 33 | 33 | 33 | 33 |
|----|----|----|----|----|----|----|----|
| 33 | 33 | 33 | 31 | 31 | 33 | 33 | 33 |
| 33 | 33 | 33 | 31 | 31 | 33 | 33 | 33 |
| 33 | 33 | 33 | 33 | 33 | 33 | 33 | 33 |
| 33 | 33 | 33 | 33 | 33 | 33 | 33 | 33 |
| 33 | 33 | 33 | 33 | 33 | 33 | 33 | 33 |

FIG. 7A

| 27 | 27 | 27 | 27 | 27 | 27 | 27 | 27 |
|----|----|----|----|----|----|----|----|
| 27 | 27 | 27 | 23 | 23 | 27 | 27 | 27 |
| 27 | 27 | 27 | 23 | 23 | 27 | 27 | 27 |
| 27 | 27 | 27 | 27 | 27 | 27 | 27 | 27 |
| 27 | 27 | 27 | 27 | 27 | 27 | 27 | 27 |
| 27 | 27 | 27 | 27 | 27 | 27 | 27 | 27 |

FIG. 7B

| 27 | 26 | 26 | 27 |
|----|----|----|----|
| 27 | 26 | 26 | 27 |
| 27 | 27 | 27 | 27 |

ARRANGEMENTS FOR ENHANCING DIGITAL WATERMARK DECODING

RELATED APPLICATION DATA

This application is a continuation of application Ser. No. 15/424,013, filed Feb. 3, 2017 (now U.S. Pat. No. 10,182,170), which claims priority to application 62/290,753, filed Feb. 3, 2016. The disclosures of these applications are incorporated herein by reference.

FIELD OF TECHNOLOGY

The present technology concerns camera-equipped point of sale systems, as are commonly employed at retail checkouts.

INTRODUCTION

Some point of sale barcode scanners are being reconfigured to also decode digital watermark data. Watermark decoding, however, can be impaired due to non-linearities (e.g., compression) commonly found in the image sensors chosen for barcode reading. Such non-linearities can diminish the small luminance variations on which watermark encoding relies. Moreover, down-sampling is generally required to convert imagery captured for barcode reading into a resolution that is suitable for watermark decoding. Such down-sampling further diminishes the small luminance variations of digital watermarks, posing a further challenge to watermark decoding.

In some of its aspects, the present technology addresses such difficulties.

Certain aspects of the technology concern changing the contrast of an image prior to decoding. In the prior art, contrast changing is typically listed among transformations to which a digital watermark should be robust (others including, e.g., rotation, cropping, sharpening, blurring, etc.)—thus treating contrast alteration as a potential threat, or attack.

Other art, however, recognizes that contrast changing can have a beneficial effect. One paper, for example, states that brightness and contrast enhancement usually do not prevent watermark detection. "On the contrary, they are often applied before detection is performed to obtain better results." (Piva et al, Copyright Protection of Digital Images by means of Frequency Domain Watermarking, SPIE's International Symposium on Optical Science, Engineering, and Instrumentation. International Society for Optics and Photonics, pp. 25-35, 1998.) In accord is U.S. Pat. No. 6,546,114, which teaches that contrast enhancement can accentuate a watermark.

Such prior art uses of contrast enhancement are understood to be information-preserving. For example, a signal with a small dynamic range (e.g., pixel values limited to the range 0-60) might be expanded in dynamic range (e.g., pixel values re-mapped to the range 0-120) by the contrast enhancement operation, to thereby accentuate the signal variations comprising the digital watermark signal.

Applicant has found that other contrast enhancement processes, which are not strictly information-preserving, can nonetheless aid in watermark decoding. For example, a process that re-maps all pixels whose values were originally in the range of 1-10, to a new, common, value of 0—losing all the information originally represented—can still enhance watermark decoding. The benefit this brings is that it enables images that are already fully contrasted (e.g., with original pixel values spanning the full range of 0-255) to be processed in manners that lose details in the shadows and highlights (setting those regions to 0 and 255 respectively, thereby losing information), and yet surprisingly still yield enhancements in watermark decoding.

Another aspect of the present technology concerns integration of such contrast processing with image downsampling.

The foregoing and additional aspects and features of the present technology will be more readily apparent from the following detailed description, which proceeds with reference to the accompanying drawings.

DETAILED DESCRIPTION

An illustrative supermarket point of sale (POS) system includes one or more 2D sensors, with mirrors and optics that provide plural different views of products that are moved above, and past, horizontal and vertical optical windows. A representative system may capture 10-90 frames of imagery per second. Each frame is 1620×1016 pixels in size, and comprises plural views of a product, composited together by the mirrors/optics.

Supermarket POS systems are optimized for reading barcodes. Barcodes ideally take the form of bitonal imagery, e.g., purely black and white. When represented in gray scale (e.g., 8-bits), a histogram of barcode pixel values desirably should show a first clump around a first value (corresponding to black), and a second clump around a second value (corresponding to white), with a gap therebetween (i.e., few or no pixels of intermediate values). Such imagery may then be processed by a thresholding operation—setting all pixels having values below the threshold value to black, and setting all pixels having values above the threshold to white (where the threshold is set in the gap between clumps).

Figure 1:
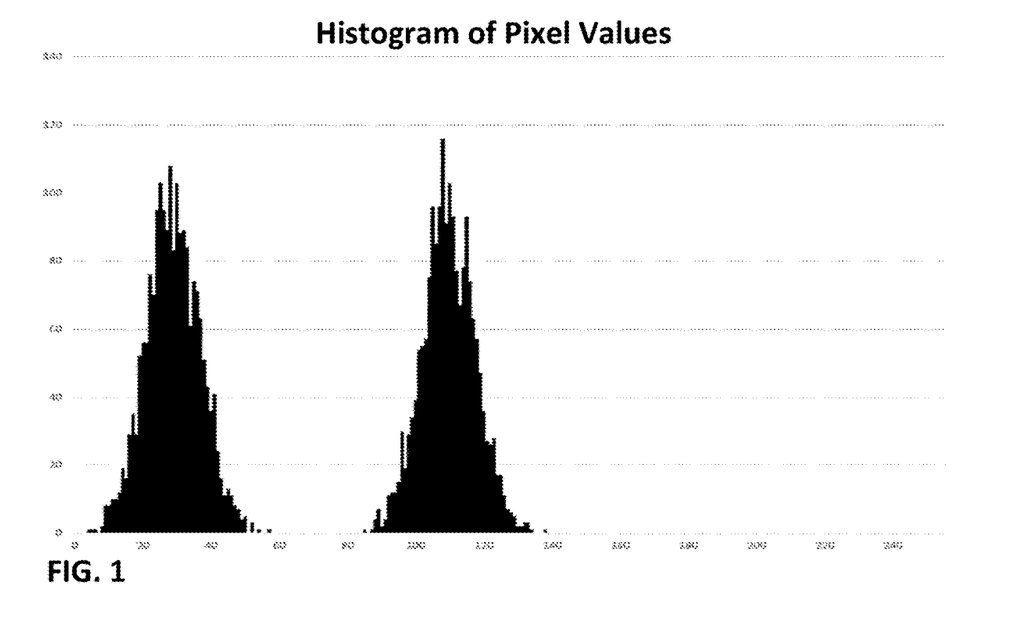
FIG. 1 shows a histogram of an image excerpt depicting a barcode.
Figure 2:
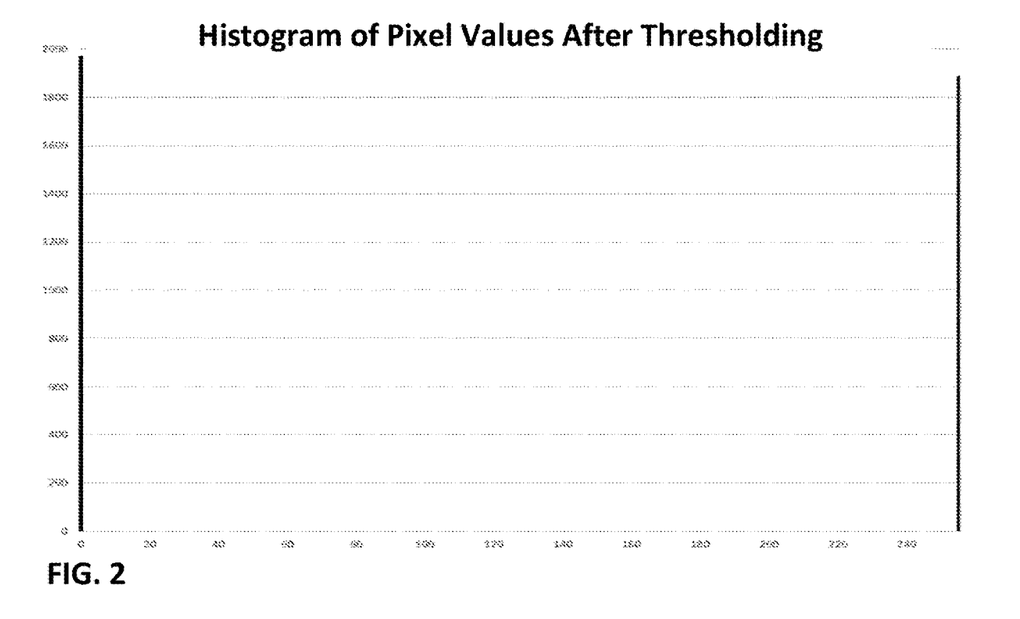
FIG. 2 shows a histogram of the image excerpt of FIG. 1 after a thresholding operation.

An example is shown in FIG. 1. There are two clumps in this histogram from an image excerpt corresponding to a barcode—one centered near pixel value 30, and one centered near pixel value 110. A suitable threshold, drawn from the gap between the clumps, may be 70. Every pixel whose value is less than 70 can be set to a value of 0. Every pixel whose value is greater than 70 can be set to a value of 255. The histogram resulting after such thresholding is shown in FIG. 2. The resulting bitonal black/white image can then be submitted to a barcode decoder routine for decoding.

Figure 3:
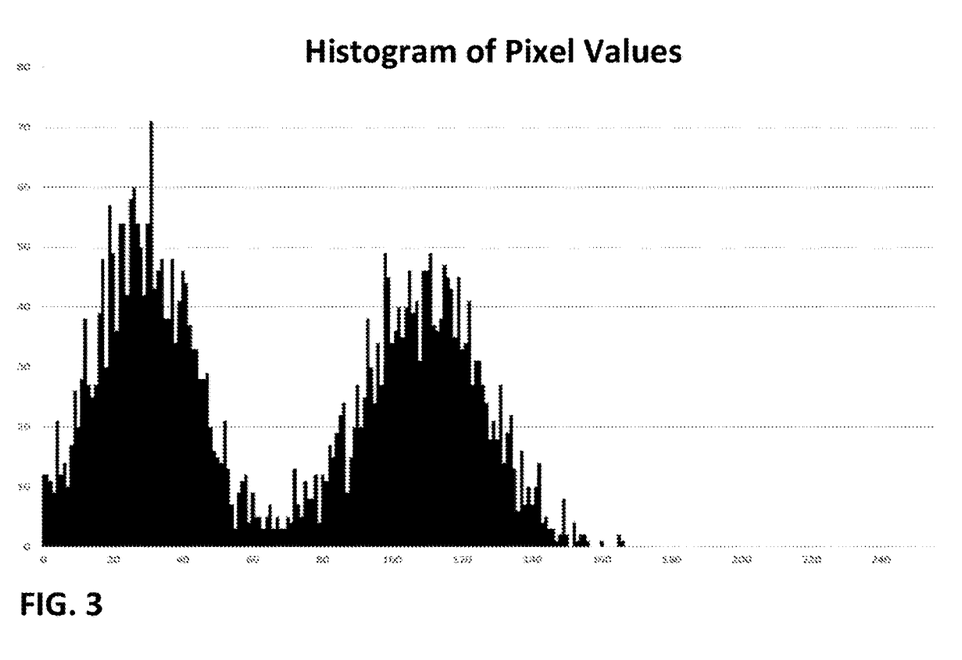
FIG. 3 shows a histogram of a different image excerpt depicting a barcode.

Another example is shown in FIG. 3. Again there are two clumps, centered near pixel values of 30 and 110. Here, however, there is no clean gap between the clumps. Nonetheless, a threshold can be chosen from between the centers of the two clumps, to again assign each pixel either a value of 0 or 255—yielding a result like that shown in FIG. 2.

While barcode decoding often employs signal processing techniques that are more sophisticated than the simple thresholding reviewed above, barcode decoding nonetheless commonly exploits an assumption that pixel values will exhibit a bi-modal behavior. That is, they will be clustered around two values. Due to such assumption, the camera systems used in POS scanners are typically simple—omitting certain calibration and correction processing, and other complexities found in other types of cameras to assure linearity and other aspects of image fidelity.

Ideally, a camera sensor exhibits a perfectly linear response. Each single digital number increase in output signal, from 0 to 255 (in an 8-bit sensor), corresponds to an identical increase in incident luminance. This is shown by the dashed line in FIG. 4.

Figure 4:
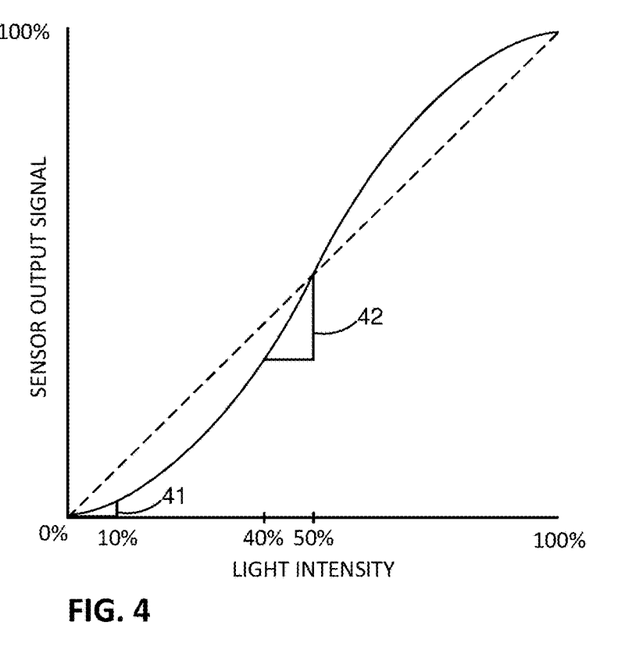
FIG. 4 is a plot showing the non-linear response of an exemplary POS camera (as compared with an ideal, linear, response).

In practice, applicant has found this is rarely the case with the sensors employed in POS scanners intended for barcode decoding. The solid line in FIG. 4 depicts the shape of a more typical POS response curve—in exaggerated fashion. As light intensity increases from low values, the sensor output signal is slow to respond commensurately ("compression"). In the depicted example, a change in input light from 0 to 10 yields a change in output signal from 0 to only 4.5, as shown at reference number 41. (A light intensity of 100 here corresponds to the point at which the sensor produces its maximum output datum—assumed to be 100 for convenience of illustration.)

In the middle part of the range, a different non-linearity ("expansion") exists. A change in incident light from 40 to 50 (an increase of 10) may yield a change in output signal from 32.3 to 49.7, as shown at reference number (an increase of 17.4).

At the top end of the range, compression is again manifested.

Again, the non-linearity is exaggerated in FIG. 4 for clarity of illustration. But applicant has found that compression at low and high light levels, and expansion at intermediate light levels, is not uncommon in POS scanners.

Such non-linearities don't matter much when decoding barcode data. Pixel values for white regions will clump together, and pixel values for black regions still clump together. (The two clumps may be compressed or expanded due to the sensor non-linearities, but they can still be readily distinguished.)

However, applicant has found that the compression can interfere with watermark reading. This is because watermark encoding relies on very small adjustments to the local luminance values of artwork printed on product packages. (Adjustments that are small in magnitude are necessary to ensure that the watermark encoding is imperceptible to consumers.) Adjustments in the range of one to four digital numbers (in a range of 0-255) in the local luminance of product artwork are commonly employed.

In the presence of compression, the small variations that characterize watermark encoding become still smaller—making detection of the watermark more difficult. This issue is most problematic when the watermarked imagery is represented by pixels mainly having values near the bottom, or near the top, of the sensor's output range (e.g., in the lowest possible quartile, between 0 and 63; or in the highest possible quartile, between 192 and 255), where compression is most commonly exhibited.

Applicant's work discovered a further issue in decoding watermark data from POS image captures. POS scanners are designed in expectation that the operator will manipulate the product so that the product barcode is close to the scanner window. The barcode is typically an inch or two on a side, and the supermarket clerk (or customer) commonly positions it adjacent to, or an inch or two away from, the window glass for best barcode reading.

Watermark data, in contrast, typically is tiled redundantly across large regions of the package (ideally, across all of the package surface). Much of the benefit of watermark-based product identification comes from this redundancy. Instead of having a single indicia from which the product identifier can be decoded (as in a barcode), a watermarked package may present a dozen or more instances of the watermark tile within view of the POS camera system; decoding of any of these tiles yields an identification for the package.

The difficulty that arises is the varying distance between different portions of the package and the camera (and light source). Instead of being just 0" to 3" away from the window glass and light source, parts of watermarked package artwork may be much further away, e.g., 6." The intensity of light from the scanner's light source diminishes as the square of distance, so portions of the package that are six inches from the light source receive illumination that is just one-ninth that received by portions that are two inches away. Again, because the POS systems are designed primarily for barcode scanning, the exposure is optimized for indicia (i.e., barcodes) placed close to the camera/light source. As a consequence, portions of the product that are more remote are typically very under-exposed (i.e., very dark).

It is difficult to decode watermark data from dark exposures, because the dynamic range of the signal is reduced. Whites aren't white; they are mid-grey at best. Bright reds looks maroon; bright blues looks navy-colored, etc. The dynamic range of the image is limited. It is compressed. This reduced dynamic range attenuates the already-small variations that characterize watermark encoding. Moreover, as discussed above in connection with FIG. 4, the compression commonly exhibited by POS image sensors at low light levels just compounds the problem.

In addition to the two challenges noted above (i.e., the typically-dark exposure with which many instances of a product's replicated watermark tile are imaged, and the compression non-linearity that compounds this difficulty), watermark decoding from POS scanner faces a third hurdle: downsampling.

Watermarks are encoded at a particular physical scale. In an exemplary system, each watermark tile embedded in the artwork of a product package is about 1.7 inches on a side. In order for the watermark decoder to successfully extract the encoded information from the captured imagery, the imagery provided to the decoder must represent the tile within a ballpark range of an expected scale. Ideally, this scale represents a 1.7 inch distance on the package with 300 pixels of imagery. However, the decoder is typically robust over a range of scale states, e.g., able to decode successfully when a 1.7 inch span on the package is represented by between 150 and 600 pixels.

POS cameras, however, typically have very high resolution. This is necessary to resolve the narrowest bars in barcode symbologies, which are on the order of 0.005"

inches across. These small bars must be distinguishable even if the barcode is positioned several inches from the camera. As a consequence of the high camera resolution, sometimes a 1.7" span on the product may be represented by more than 600 pixels. At such scale, a watermark tile will not be decoded. Moreover, if the product is held close to the camera, the camera's field of view may not encompass other tiles from which the watermark payload can be recovered. As a consequence, no data at all may be decoded.

To avoid such failure, POS-captured imagery is typically down-sampled prior to watermark decoding, to assure than 1.7" on the product is always represented by less than 600 pixels. Down-sampling can comprise, e.g., replacing each 2×2 pixel region of the original image with a single pixel, whose value is the average of the four pixels it replaces (i.e., sum of the pixel values, divided by four).

Applicant has found, however, that this down-sampling again impairs the small differences in pixel values on which watermark encoding is reliant.

Figure 5A:
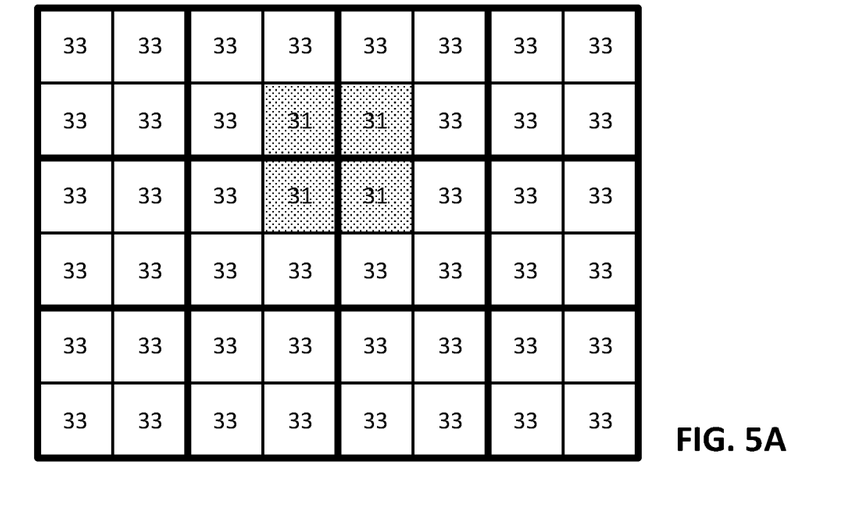
FIGS. 5A and 5B depict an image down-sampling operation, in which image variation is lost.

Consider the example shown in FIG. 5A. The original scanner pixel values are presented by the numerals in the boxes. Most have values of 33. However, the watermark encoding has adjusted the luminance of a portion of the artwork so that it is represented by a few captured pixels having values of 31 (shaded).

Figure 5B:
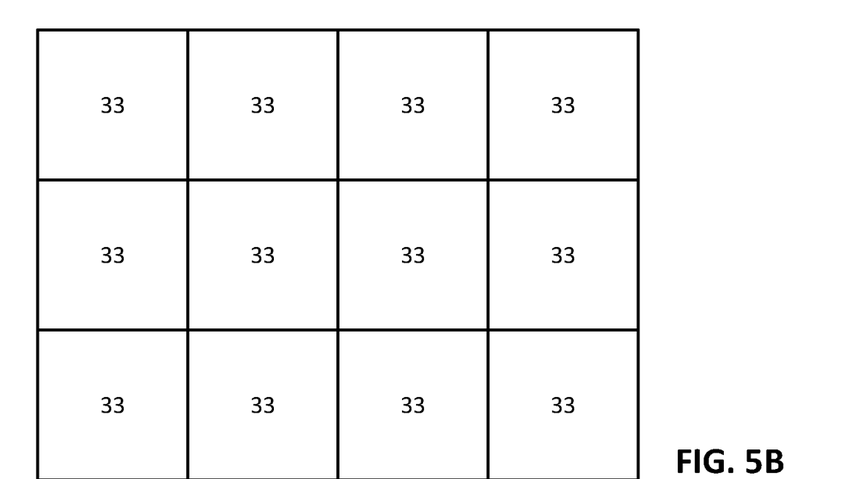

The dark-lined squares in FIG. 5A show 2×2 groupings of pixels, whose four component values are averaged to yield a single pixel value in a down-sampled image frame, shown in FIG. 5B. Pixels, however, can have only integer values. The average of (33, 33, 33, 31) is 32.5. But due to the fractional "0.5" part, the resulting pixel is conventionally rounded-up and assigned an integer value of 33. As shown in the down-sampled image excerpt of FIG. 5B, the variation in pixel values that represents the watermarked information has been lost. All of the down-sampled pixels have a value of 33.

To help mitigate the three problems discussed above, applicant has discovered that contrast enhancement can be applied advantageously to the imagery captured by the POS camera. So-doing tends to enlarge the variations between pixel values—including the variations that represent the watermark data. This enables more reliable decoding of watermark data, even in the presence of dark exposures, sensor compression, and downsampling.

Figure 6A:
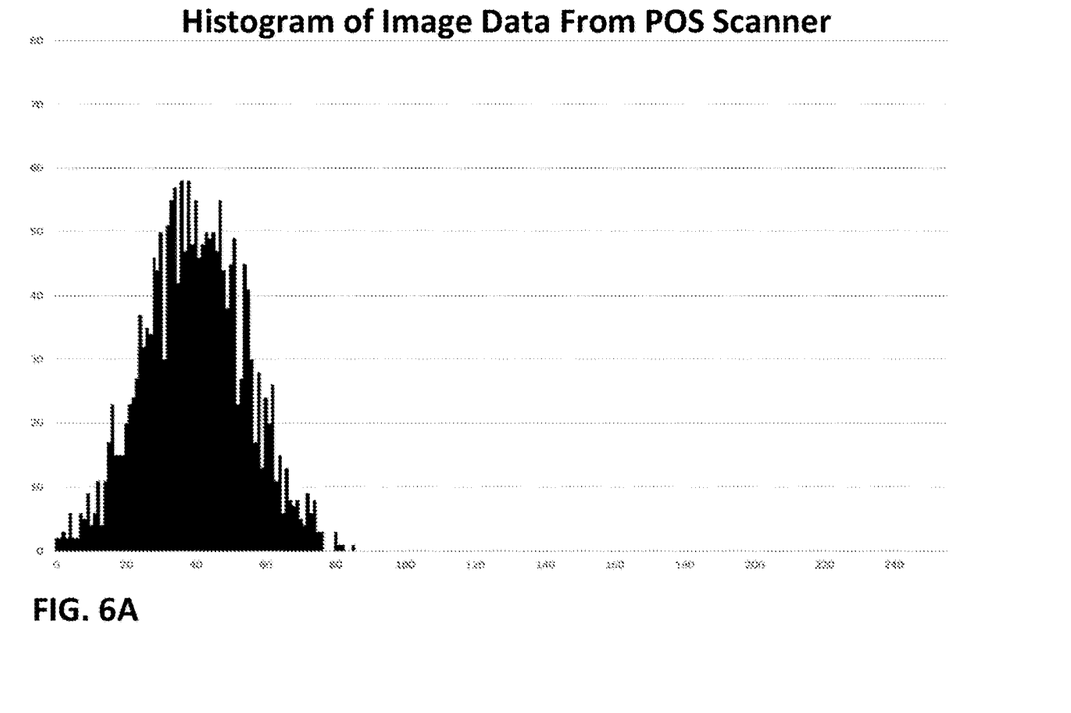
FIG. 6A shows a histogram of an image excerpt from a POS camera.
Figure 6B:
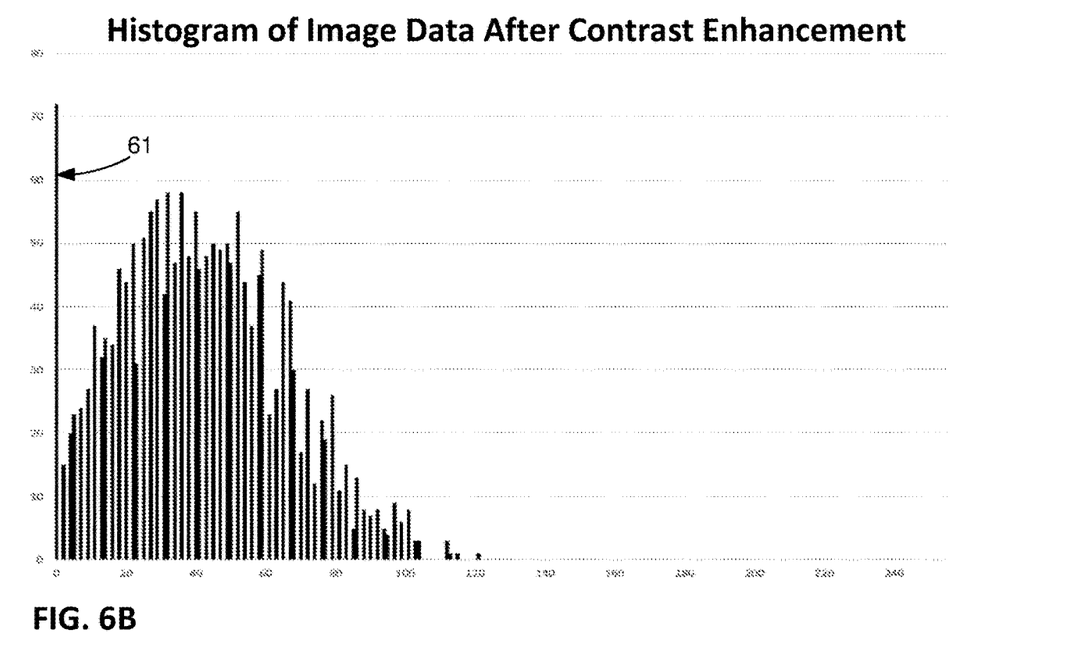
FIG. 6B shows a histogram of the image excerpt of FIG. 6A after contrast enhancement.

Contrast enhancement serves to enlarge the range of pixel values of an image (or image portion). FIG. 6A shows a histogram of pixel values in an under-exposed image excerpt. FIG. 6B shows the same image excerpt after contrast enhancement.

As can be seen, the difference between the minimum and maximum pixel values has spread to span a larger value in FIG. 6B, as compared to FIG. 6A. (However, in this particular example, the number of different pixel values has not changed.)

The contrast enhancement method employed in this example has an interesting artifact. The algorithm attempts to assign negative values to some pixels. However, pixels cannot have values below zero. So those pixels that the algorithm indicates should have values below zero are assigned a value of zero, instead. This accounts for the large spike, 61, in the histogram at the pixel value of zero.

In particular, all pixels in the original image having a value of 17 or less in FIG. 6A, are assigned a pixel value of zero by the contrast enhancement algorithm applied in FIG. 6B.

Applicant had originally been concerned that this artifact would impair watermark decoding. For example, if a particularly-dark region of the image had pixels whose values ranged—due to watermark encoding—between 10 and 15, all such watermark-encoding variations would be lost by the contrast enhancement. All such pixels would have values of 0.

Surprisingly, applicant found that more is gained than is lost by such contrast enhancement. While some watermark information is lost (as in the foregoing paragraph), this detriment is more than offset by gains to watermark decoding achieved by the contrast enhancement-spreading of other pixel values.

That is not to say that contrast enhancement can be applied indiscriminately. However, so long as the count of non-zero pixels in the input imagery, which are set to zero by contrast enhancement, is less than 15-25% of the total count of pixels in the input imagery, then it appears more is gained than is lost, and that contrast enhancement can be applied with advantageous effects.

Figure 7A:
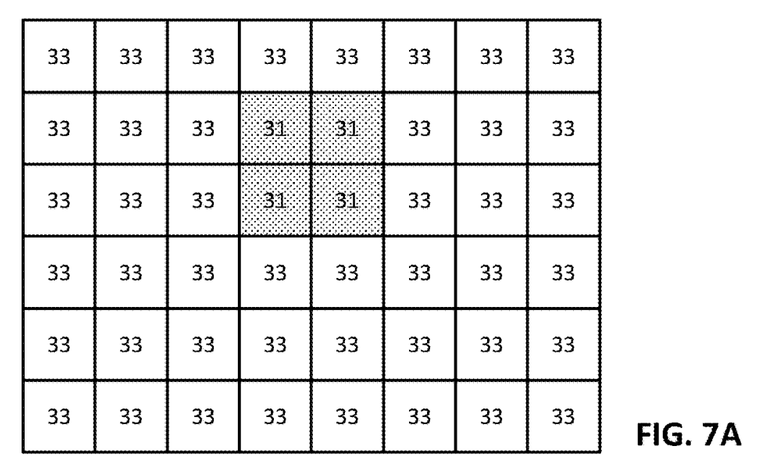
FIGS. 7A, 7B and 7C depict image processing including contrast enhancement and downsampling, in which image variation is maintained.
Figure 7B:
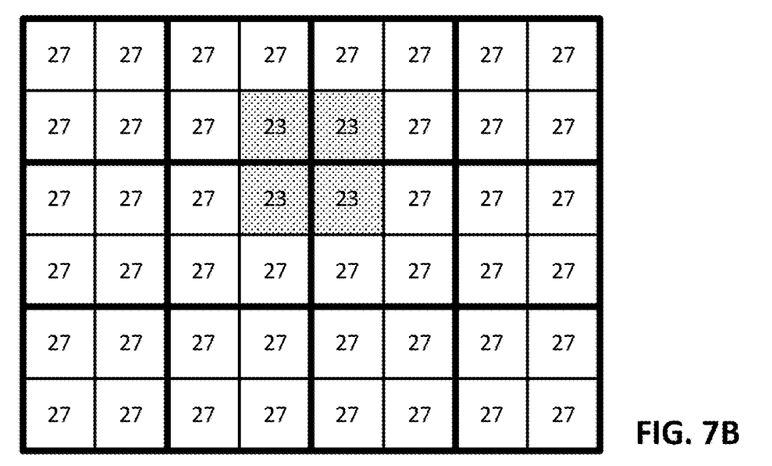
Figure 7C:
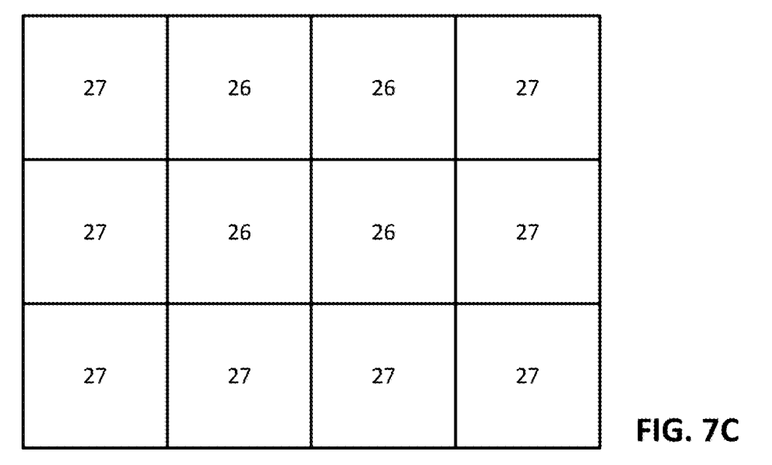

These advantageous effects extend to down-sampling. Consider, again, the example of FIG. 5A, reproduced as FIG. 7A. In the just-discussed contrast enhancement example, pixels having original values of 33 are assigned new, enhanced, values of 27. Pixels having original values of 31 are assigned new, enhanced, values of 23. So the 2×2 region in FIG. 7A that was originally (33, 33, 33, 31) becomes (27, 27, 27, 23) in the contrast-enhanced image of FIG. 7B. When down-sampled to the pixel array of FIG. 7C, the 2×2 blocks having values of (27, 27, 27, 23) average out to 26. FIG. 7C thus includes some pixels having values of 27, and others having values of 26, thereby preserving some of the watermark-encoding variation of the original imagery—variation that was lost in FIG. 5B.

Figure 8A:
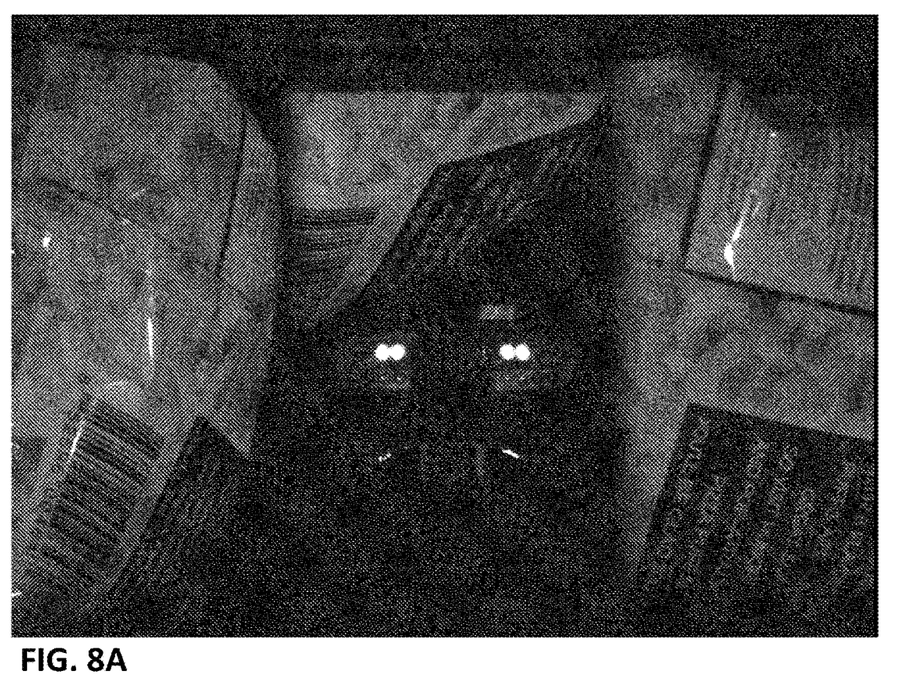
FIG. 8A shows an image from a POS camera.

FIG. 8 shows an actual example of contrast enhancement in a POS image. FIG. 8A shows an original image, taken from a snack bag. It is generally under-exposed, yet pretty much spans the sensor's full dynamic range of 0-255. The only areas of true white are areas of specular reflection (glare) from the glossy product bag.

Figure 8B:
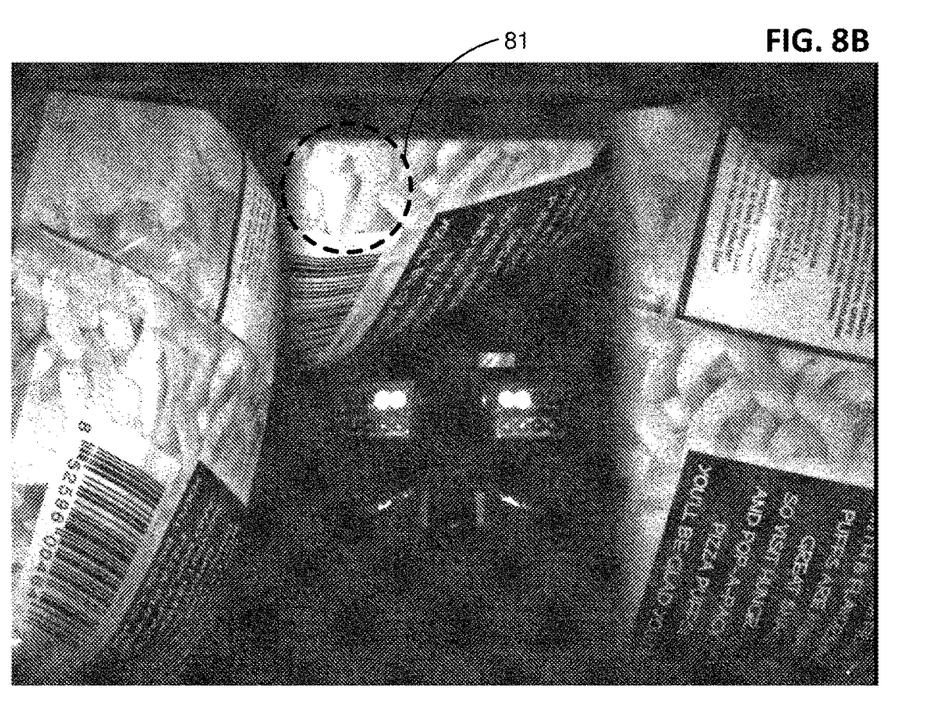
FIG. 8B shows the image of FIG. 8A after contrast enhancement.

FIG. 8B shows the image after contrast enhancement. The span of pixel values has been stretched. Many more areas are truly white. Indeed, in some locations, this has resulted in "blown highlights" (as shown at numeral 81). In such locations, much of the original variation in pixel value has been lost by the contrast enhancement (i.e., pixels that originally had different values now all have the same value, 255, in the enhanced image). Despite such degradation of the imagery, watermark detection is enhanced by the enhanced (enlarged) variation between other of the pixels' values.

Figure 9A:
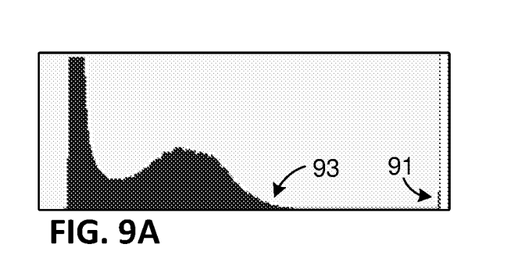
FIG. 9A shows a histogram of the FIG. 8A image.
Figure 9B:
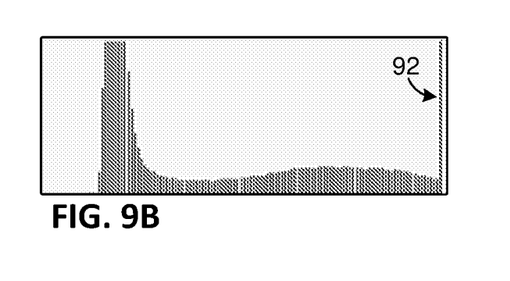
FIG. 9B shows a histogram of the FIG. 8B image.

FIGS. 9A and 9B are histograms of the pixel values of FIGS. 8A and 8B, respectively. In FIG. 9A the few points of specular reflection (absolute white) are shown by the small blip 91 at the right-most edge of the plot. In FIG. 9B, the blown highlights are shown by the tall line 92 at the right-most edge off the plot. (The right "tail" 93 of the FIG. 9A histogram has all been transformed to a value of 255 by the contrast enhancement operation.)

It will be recognized that FIG. 8B is an example of unilateral contrast stretching (enhancement). That is, the value of the lowest pixel in FIG. 8A is unchanged in FIG. 8B. All of the contrast enhancement has been to the right (as shown by the right-ward stretching of the FIG. 9B histogram). No part of the FIG. 8A image has been made darker in FIG. 8B. In other embodiments, bilateral contrast enhancement can be employed, with some pixels being made darker, and others being made lighter. (In such case, some pixels that were originally differently valued may all be assigned a value of 0, and some other pixels that were originally differently valued may all be assigned a value of 255.)

Concluding Remarks

Having described and illustrated principles of the technology with reference to illustrative examples, it should be recognized that the technology is not so-limited.

For example, while the examples focused on regions comprised mainly of low-valued pixels (e.g., 8-bit values of 63 and under), it should be emphasized that the same principles likewise apply to regions comprised of other values. In image regions comprised mainly of high-valued pixels, an artifact like that shown at numeral 61 can appear but at pixel value 255. That is, pixels of many different values are all re-mapped, by the contrast enhancement algorithm, to a common value of 255. Again, some information is lost, but commonly a net improvement in watermark decoding is achieved.

A variety of contrast enhancement algorithms are known, including Histogram Equalization, and Adaptive Histogram Equalization. These techniques are detailed in two Wikipedia articles by the same names that form part of priority application 62/290,753. Another method is Contrast Stretching. Still other methods are described in Kotkar, et al, Review of various image contrast enhancement techniques, International Journal of Innovative Research in Science, Engineering and Technology 2.7 (2013): 2786-2793; and Kaur, et al, Survey of contrast enhancement techniques based on histogram equalization, International Journal of Advanced Computer Science and Applications 2.7 (2011): 137-141.

In many embodiments, a full frame of camera-captured data is not processed by a single contrast enhancement operation. More commonly, different regions of the frame are contrast-enhanced separately. For example, a blob-detection or image segmentation (e.g., region growing) algorithm can be applied to a frame of received imagery to identify excerpts characterized by similarity in feature (e.g., luminance, texture, etc.). One excerpt may be characterized by contiguous pixels defining a region in which at least 50% of the pixels (or 60% or 75% or 90%, etc.) have values value below a first threshold value, such as 80. Another excerpt may be characterized by contiguous pixels defining a region in which at least 50% (or 60%, or 75% or 90%) have values above a second threshold value, such as 150. The thresholds may be determined adaptively. There may be one, two, or more such excerpts identified by the algorithm(s) in an image frame. Each different excerpt may be differently contrast-enhanced, separately. In the example just given, two pixels in the first excerpt that began with different values, may both be remapped to the same value (e.g., 0). Similarly, two pixels in the second excerpt, which began with different values, may both be remapped to the same value (e.g., 255). (Blob detection and image segmentation typically proceed by more sophisticated methods, as detailed in the Wikipedia articles Blob Detection and Image Segmentation that are attached to priority application 62/290, 753.)

The contrast enhancement of FIGS. 6A/6B was achieved by subtracting 40 from each input pixel value, multiplying the result by 1.8, and then adding 40. The integer parts were then taken as the output pixel values. Negative values were set to zero, and values over 255 were set to 255. (40 was selected as being the mean, or median, value of the pixel values; 1.8 was selected as a spreading factor.)

Contrast enhancement algorithms are typically tuned (e.g., by selection of mathematical constants) to yield results that are pleasing—or at least inoffensive—to human viewers. In embodiments of the present technology, in contrast, such considerations need play no role. The contrast enhancement algorithm may be tuned to produce visual artifacts that are objectionable to human viewers. For example, in an image frame where the watermark information is represented in the lower half or quartile of pixel values, the contrast may be adjusted so that all lighter variations in the image are lost, replaced by absolute white (so-called blown highlights). Conversely, if the watermark information is found in the upper half or quartile of pixel values, the contrast may be adjusted so that all the variations in dark tones are lost, replaced by absolute black (so-called clipped shadows). Artisans who are familiar with conventional contrast enhancement tools (e.g., in Photoshop image processing software) are warned away from such adjustments. Here they can be embraced.

In some embodiments, contrast-enhancement can be combined with down-sampling. One way of doing so is to sum the values of a neighborhood of pixels (e.g., a 2×2 neighborhood in the example of FIG. 7A). However, instead of dividing the sum by the number of pixels involved, to obtain an average, the sum is divided by a lesser number (e.g., 3, or 2.5, instead of 4). This has the effect of spreading out the pixel values—increasing their range. If such algorithm results in one or more new values greater than 255, a value of 255 is used. (This is a further situation in which pixels that originally had different values, are remapped to the same value: 255, thereby losing the varied information they originally expressed.)

In one particular embodiment, both barcode decoding and watermark decoding is applied to captured imagery. The barcode decoding operates on imagery without contrast enhancement and at full resolution, whereas the watermark decoding operates on contrast-enhanced imagery, after down-sampling. In another embodiment, barcode decoding can be applied after contrast enhancement.

This specification has assumed that pixels are represented with an 8-bit pixel depth, i.e., with values ranging from 0 to 255. The artisan will recognize that the same principles are likewise applicable to any other form of pixel representation, such as 10-bit numbers.

Although down-sampling is commonly performed using square neighborhoods of pixels (e.g., 2×2, 3×3, etc.), this need not be the case. Another neighborhood has 5 pixels: a center pixel, and the four pixels that adjoin the edge of the center pixel. (This results in staggering of the centers of the down-sampled pixels.) In other embodiments the neighborhoods needn't be symmetrical When this document refers to image data comprised "mainly" of pixels of a certain value (e.g., less than 128, or less than 64), applicant means that at least 50% of the pixels meet the value criterion. In some instances, 75%, 90% or 97% or more of the pixels may meet such criterion.

Linearity is further discussed in U.S. Pat. No. 7,443,537. Although that patent concerns linearity of printing systems, the same principles apply to linearity of camera systems.

Watermark technology is further detailed in applicant's patent documents U.S. Pat. Nos. 6,590,996, 9,182,778, 9,245,308, 20150156369, 20150030201, and application Ser. No. 14/932,645, filed Nov. 4, 2015 (now published as 20160198064), Ser. No. 14/842,575, filed Sep. 1, 2015 (now published as 20170004597), Ser. No. 14/725,399, filed May 29, 2015 (now published as 20160275639), and Ser. No. 14/724,729, filed May 28, 2015 (now published as 20160217547).

Applicant's other patent documents that relate to the present technology include U.S. Pat. No. 9,129,277, 20140357312, 20140304122, and application 62/174,454, filed Jun. 11, 2015 (attached to priority application 62/290,753, and serving as priority for utility application Ser. No. 15/176,498, filed Jun. 8, 2016, now U.S. Pat. No. 9,922,220), and 62/128,806, filed Mar. 5, 2015 (which serves as priority for utility application Ser. No. 15/059,690, filed Mar. 3, 2016, now U.S. Pat. No. 9,892,301).

Reference was made to watermark encoding being imperceptible. Imperceptible here means that the presence of the watermark is not noticeable to a consumer examining a watermarked object from a typical viewing distance (e.g., 20 inches) under customary retail lighting (e.g., 75-85 footcandles), who has not been previously alerted to the existence of such marking.

The design of point of sale systems and other computing devices referenced in this disclosure is familiar to the artisan. In general terms, each includes one or more processors, one or more memories (e.g. RAM), storage (e.g., a disk or flash memory), a user interface (which may include, e.g., a keypad, a TFT LCD or OLED display screen, touch or other gesture sensors, a camera or other optical sensor, one or more microphones, etc., together with software instructions for providing a graphical user interface), interconnections between these elements (e.g., buses), and an interface for communicating with other devices (which may be wireless, such as GSM, 3G, 4G, CDMA, WiFi, WiMax, Zigbee or Bluetooth, and/or wired, such as through an Ethernet local area network, etc.).

While the emphasis of this disclosure has been on POS systems, it will be recognized that the same principles can likewise be applied to watermark reading by mobile devices, such as smartphones and tablets.

The processes and system components detailed in this specification can be implemented as instructions for computing devices, including general purpose processor instructions for a variety of programmable processors, such as microprocessors and systems on a chip (e.g., the Intel Atom, the ARM A8 and Cortex series, the Qualcomm Snapdragon, and the Nvidia Tegra 4; the latter includes an ARM CPU, a GPU, and Nvidia's Chimera computational photography architecture). Implementation can also employ a variety of specialized processors, such as graphics processing units (GPUs, such as are included in the Nvidia Tegra series, and the Adreno 530—part of the Qualcomm Snapdragon processor), and digital signal processors (e.g., the Texas Instruments TMS320 and OMAP series devices, and the ultra-low power Qualcomm Hexagon devices, such as the QDSP6V5A), etc. These instructions can be implemented as software, firmware, etc. These instructions can also be implemented in various forms of processor circuitry, including programmable logic devices, field programmable gate arrays (e.g., the Xilinx Virtex series devices), field programmable object arrays, and application specific circuits—including digital, analog and mixed analog/digital circuitry. Execution of the instructions can be distributed among processors and/or made parallel across processors within a device or across a network of devices. Processing of data can also be distributed among different processor and memory devices. Cloud computing resources can be used as well. References to "processors," "modules" or "components" should be understood to refer to functionality, rather than requiring a particular form of implementation.

Implementation can additionally, or alternatively, employ special purpose electronic circuitry that has been custom-designed and manufactured to perform some or all of the component acts, as an application specific integrated circuit (ASIC).

To review an exemplary ASIC design process, a module (e.g., a watermark reading module, or a contrast enhancement module) is first implemented using a general purpose computer, using software such as Matlab (from Mathworks, Inc.). A tool such as HDLCoder (also available from MathWorks) is next employed to convert the MatLab model to VHDL (an IEEE standard, and doubtless the most common hardware design language). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

ASIC implementation can similarly start with a C, or C++, software description of the algorithm. So-called "C-to-Silicon" tools, can then be used. Such tools are available from Calypto Design Systems (e.g., Catapult), Synopsys (e.g., Synphony C Compiler), and Cadence Design Systems (e.g., Cynthesizer). Again, the resulting HDL output (e.g., Verilog) is used to generate a netlist and layout data for silicon fabrication.

In addition to providing output descriptions by which ASIC chips can be fabricated, the outputs from such tools (e.g., RTL-based HDL) can additionally/alternatively be used to configure FPGAs and other such logic. One family of such logic that is particularly suitable to image processing is EFLX-2.5K all-logic FPGA core in TSMC 28 nm High Performance Mobile (HPM) process technology from FlexLogic.

As indicated above, reference to a "module" that performs a certain function should be understood to encompass one or more items of software, and/or one or more hardware circuits—such as an ASIC as just-described.

Software instructions for implementing the detailed functionality can be authored by artisans without undue experimentation from the descriptions provided herein, e.g., written in C, C++, Visual Basic, Java, Python, Tcl, Perl, Scheme, Ruby, etc., in conjunction with associated data.

Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—special purpose computer systems in which operating system software and application software are indistinguishable to the user (e.g., as is commonly the case in basic cell phones). The functionality detailed in this specification can be implemented in operating system software, application software and/or as embedded system software.

Different of the functionality can be implemented on different devices. For example, in a system in which a point of sale scanner/terminal at a supermarket checkout communicates with a central store computer, different tasks can be performed exclusively by one device or the other, or execution can be distributed between the devices. Contrast enhancement and watermark decoding are examples of processes that each can be distributed in such fashion. Thus, it should be understood that description of an operation as being performed by a particular device (e.g., a point of sale terminal) is not limiting but exemplary; performance of the operation by another device (e.g., a remote server), or shared between devices, is also expressly contemplated.

In like fashion, description of data being stored on a particular device is also exemplary; data can be stored anywhere: local device, remote device, in the cloud, distributed, etc.

Although this disclosure contemplates watermark-based identification of products, fingerprint-based content identification (i.e., recognition of inherent, rather than added, patterns) can be used instead. Again, the contrast enhancement arrangements detailed herein can be advantageously employed.

It should be understood that the methods, elements and concepts detailed in connection with one embodiment can be combined with the methods, elements and concepts detailed in connection with other embodiments. While some such arrangements have been particularly described, many have not—due to the large number of permutations and combinations. Applicant similarly recognizes and intends that the methods, elements and concepts of this specification can be combined, substituted and interchanged—not just among and between themselves, but also with those known from the cited prior art. Moreover, it will be recognized that the detailed technology can be included with other technologies—current and upcoming—to advantageous effect. Implementation of such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various of the features of a complete system).

While certain aspects of the technology have been described by reference to illustrative methods, it will be recognized that apparatuses configured to perform the acts of such methods are also contemplated as part of applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

To provide a comprehensive disclosure, while complying with the Patent Act's requirement of conciseness, applicant incorporates-by-reference each of the documents referenced herein. (Such materials are incorporated in their entireties, even if cited above in connection with specific of their teachings.) These references disclose technologies and teachings that applicant intends be incorporated into the arrangements detailed herein, and into which the technologies and teachings presently-detailed be incorporated.

For example, the cited references teach that it is desirable to identify excerpts of the POS imagery that most likely have barcode or watermark encoding early in the image processing, so that subsequent processing can focus efforts on such excerpts—increasing processing efficiency. Such teaching, and particular methods, are found in references 20150030201, 62/128,806 and Ser. No. 15/059,690, cited above. From the incorporated-by-reference disclosures, an artisan would be taught to employ these and other such features in embodiments of the present technology.

In view of the wide variety of embodiments to which the principles and features discussed above can be applied, it should be apparent that the detailed embodiments are illustrative only, and should not be taken as limiting the scope of the invention. Rather, applicant claims as the invention all such modifications as may come within the scope and spirit of the following claims and equivalents thereof.

The invention claimed is:

1. An apparatus comprising:
a camera; and
processing circuitry, the processing circuitry being adapted to extract digital watermark data from imagery captured by the camera, the processing circuitry being more particularly configured to perform acts including:
receiving imagery including first and second pixels having different values, both of said values being less than a maximum possible pixel value and greater than zero;
contrast-enhancing the imagery, including changing values of both the first and second pixels; and
applying a digital watermark decoding process to the contrast-enhanced imagery, to extract identification data for an item depicted in the received imagery;
wherein said contrast-enhancing comprises changing both said first and second pixels to a shared value, wherein a difference in value between the first and second pixels is lost.

2. The apparatus of claim 1 in which the maximum possible pixel value is characterized by a bit depth at which the pixels are represented, wherein the processing circuitry is configured to change values of both the first and second pixels to equal said maximum possible pixel value.

3. The apparatus of claim 1 in which the processing circuitry is configured to change values of both the first and second pixels to equal zero.

4. The apparatus of claim 1 in which the processing circuitry is configured to down-sample the imagery as part of, or after, said contrast-enhancing act, yielding a set of imagery that is smaller than the received imagery, wherein said contrast-enhancing act aids in preserving differences in pixel values that would otherwise be lost by said down-sampling.

5. The apparatus of claim 1 in which at least 50 percent of the pixels in said received imagery have values in a lowest possible quartile.

6. The apparatus of claim 1 in which at least 75 percent of the pixels in said received imagery have values in a lowest possible quartile.

7. The apparatus of claim 1 in which at least 97 percent of the pixels in said received imagery have values in a lowest possible quartile.

8. The apparatus of claim 4 in which said down-sampling includes summing pixel values in the received imagery for plural neighborhoods of N pixels, yielding plural summed values, and dividing each of said summed values by a value K, where K<N, wherein a result of each such division operation is assigned as a value to a corresponding pixel in said set of down-sampled imagery.

9. The apparatus of claim 8 in which the maximum possible pixel value is characterized by a bit depth at which the pixels are represented, wherein at least one of said divisions yields a value that is greater than said maximum possible pixel value, and a pixel in said set of down-sampled imagery corresponding to said division operation is instead assigned said maximum possible pixel value.

10. The apparatus of claim 8 in which the processing circuitry is additional configured to apply a barcode reading process to a version of the captured imagery to which said down-sampling act—including said division by K, has not been applied.

11. The apparatus of claim 1 in which the processing circuitry is additionally configured to apply a first contrast enhancement process to a first excerpt of the imagery, and apply a second, different, contrast enhancement process to a second, different excerpt of the imagery.

12. The apparatus of claim 11 in which the first excerpt consists of a first set of pixels—at least 50% of which have values below a first threshold.

13. The apparatus of claim 12 in which the second excerpt consists of a second set of pixels—at least 50% of which have values above a second, different threshold.

14. The apparatus of claim 1 in which said camera exhibits compression of pixel values in the lowest quartile and/or in the highest quartile of pixel values, making small variations that characterize watermark signal encoding in said quartile(s) become still smaller.

15. The apparatus of claim 1 in which the processing circuitry comprises a programmable processor configured in accordance with stored software instructions.

16. An apparatus comprising:
a camera; and
processing circuitry, the processing circuitry being adapted to extract digital watermark data from imagery captured by the camera, the processing circuitry being more particularly configured to perform acts including:
receiving imagery including a first number of pixels;
down-sampling imagery in the received imagery, to yield a second set of imagery having a second number of pixels less than said first number, the down-sampling including processing each of plural neighborhoods of N pixels, where N>1, to derive a value for a corresponding single pixel in the second set of imagery; and
watermark processing the down-sampled second set of imagery to extract identification data for an item depicted in the received imagery;
wherein said down-sampling includes, for each of said plural neighborhoods of N pixels, summing values of the N pixels, and dividing the sum by a value K, where K<N.

17. The apparatus of claim 16 wherein:
the pixels in the second set of imagery have a maximum possible binary value;
a first of said divisions yields a first value that is greater than said maximum possible binary value; and
the processing circuitry is configured to assign the maximum possible binary value to said first pixel, instead of said first value.

18. The apparatus of claim 17 wherein:
a second of said divisions yields a second value that is greater than said maximum possible value, said second value being different than said first value; and
the processing circuitry is configured to assign the maximum possible binary value to said second pixel, instead of said second value;
wherein said first and second divisions yield different values, but the first and second pixels are instead assigned a common value.

19. The apparatus of claim 16 in which the processing circuitry is further configured to apply said down-sampling act—including said division by K, when using the imagery for digital watermark detection, but not applying said down-sampling act—including said division by K, when using the imagery for barcode detection.

20. The apparatus of claim 16 wherein the pixels in the second set of pixels span a greater range of values than pixels in the received imagery.

21. The apparatus of claim 16 in which said camera exhibits compression of pixel values in the lowest quartile and/or in the highest quartile of pixel values, making small variations that characterize watermark signal encoding in said quartile(s) become still smaller.

22. The apparatus of claim 16 in which said camera exhibits compression of pixel values in the lowest quartile and/or in the highest quartile of pixel values, making small variations that characterize watermark signal encoding in said quartile(s) become still smaller.

23. The apparatus of claim 16 in which the processing circuitry comprises a programmable processor configured in accordance with stored software instructions.

24. An apparatus for processing camera-captured imagery, said imagery comprising plural pixels including first and second pixels having different values, both of said values being less than a maximum possible pixel value and greater than zero, the apparatus including:
first means for contrast-enhancing the imagery; and
a digital watermark decoder for processing contrast-enhanced imagery produced by said first means, to extract identification data for an item depicted in said imagery;
wherein said first mean changes both said first and second pixels to a shared value, wherein a difference in value between the first and second pixels is lost.

* * * * *